United States Patent
Archer et al.

(10) Patent No.: US 8,552,839 B2
(45) Date of Patent: Oct. 8, 2013

(54) METHOD AND APPARATUS FOR MANAGING RADIO FREQUENCY IDENTIFICATION (RFID) TAGS

(75) Inventors: Steven T. Archer, Dallas, TX (US); Francisco A. Dias, Corinth, TX (US); Kristopher A. Pate, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 842 days.

(21) Appl. No.: 11/564,535

(22) Filed: Nov. 29, 2006

(65) Prior Publication Data

US 2008/0122622 A1     May 29, 2008

(51) Int. Cl.
    *H04Q 5/22*      (2006.01)

(52) U.S. Cl.
    USPC ..... 340/10.42; 340/10.1; 340/10.3; 340/5.91; 340/5.92; 340/539.1; 340/539.13; 340/539.26; 340/572.1; 235/385; 235/435; 382/195; 700/215

(58) Field of Classification Search
    USPC ................ 340/10.42, 10.1, 5.91, 5.92, 572.1, 340/10.3, 539.1, 539.13, 539.26; 235/385, 235/435; 382/195; 700/215; 370/349, 389, 370/392, 393, 466, 471; 709/217, 226, 245, 709/249
See application file for complete search history.

(56) References Cited

U.S. PATENT DOCUMENTS

| | | | |
|---|---|---|---|
| 2004/0015418 A1* | 1/2004 | Dooley et al. | 705/28 |
| 2004/0049428 A1* | 3/2004 | Soehnlen et al. | 705/25 |
| 2004/0162915 A1* | 8/2004 | Caronni et al. | 709/245 |
| 2004/0193449 A1* | 9/2004 | Wildman et al. | 705/2 |
| 2004/0268132 A1 | 12/2004 | Waris | |
| 2005/0096753 A1* | 5/2005 | Arling et al. | 700/11 |
| 2005/0159823 A1* | 7/2005 | Hayes et al. | 700/19 |
| 2005/0199716 A1 | 9/2005 | Shafer et al. | |
| 2005/0252971 A1 | 11/2005 | Howarth et al. | |
| 2005/0253718 A1* | 11/2005 | Droms et al. | 340/572.1 |
| 2006/0022800 A1* | 2/2006 | Krishna et al. | 340/10.2 |
| 2006/0034282 A1* | 2/2006 | Hattig | 370/392 |
| 2006/0075269 A1* | 4/2006 | Liong et al. | 713/300 |
| 2006/0091999 A1 | 5/2006 | Howarth | |
| 2006/0280181 A1* | 12/2006 | Brailas et al. | 370/392 |

\* cited by examiner

*Primary Examiner* — Steven Lim
*Assistant Examiner* — Sisay Yacob

(57) ABSTRACT

An approach is provided for managing network addressable radio frequency identification (RFID) tags. A management agent collects data from a radio frequency identification (RFID) tag that is assigned a network address for visibility within a data network. The agent generates a management message including the data for transmission over the data network to a manager configured to communicate with the agent using a management protocol.

24 Claims, 9 Drawing Sheets

METHOD AND APPARATUS FOR MANAGING RADIO FREQUENCY IDENTIFICATION (RFID) TAGS

BACKGROUND INFORMATION

Radio frequency identification (RFID) devices have emerged as an attractive approach for a variety of tracking applications. These devices, also referred to as "tags" or "labels," are typically affixed to objects for identifying and tracking of such objects. An RFID tag is scanned or "interrogated" using radio frequency electromagnetic waves, which permit non-line of sight communication with an RFID reader. RFID tags include circuitry that can be either active or passive. When a passive RFID tag is within range of the REID reader, the antenna of the tag receives energy from the broadcast signals of the reader. However, the transmissions are confined to a relatively short range within a physical facility or localized site. Consequently, RFID applications have been developed for site specific usage, with little or no capability to coordinate across multiple sites. Also, conventional tracking systems lack sufficient integration with data communication systems to exploit the advantages of networking technologies.

Therefore, there is a need for an approach that permits greater application of RFID technology, without the constraint of distance in a manner that leverages networking technologies.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for tracking radio frequency identification (RFID) tags over a data network are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
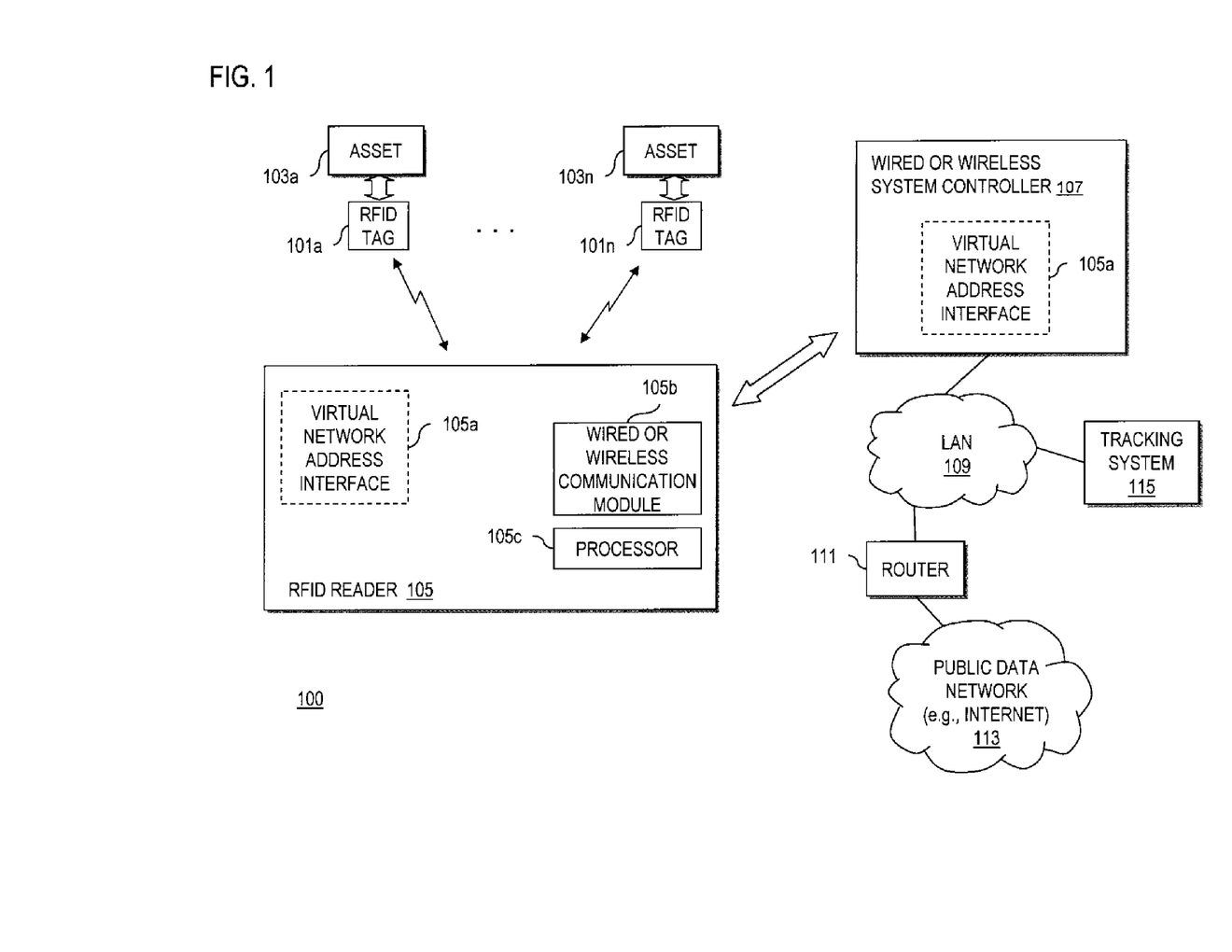
FIG. 1 is a diagram of a tracking system capable of utilizing a network management protocol to track radio frequency identification (RFID) tags, according with an exemplary embodiment.

FIG. 1 is a diagram of a tracking system capable of utilizing a network management protocol to track radio frequency identification (RFID) tags, according with an exemplary embodiment. An RFID system 100 provides for tracking of assets or objects using RFID tags (or transponders) 101 that are affixed to the assets 103. An RFID reader 105 detects different RFID tags 101 and captures the associated RFID signals. As shown, the RFID reader 105 includes a virtual network address interface 105*a* that maps network routable addresses, such as an Internet Protocol (IP) address, to the particular RFID tags 101; the virtual network address interface 105*a* can also be deployed within other components or network devices. Through the address mapping, the RFID tags 101 are given network presence. This mapping process is further detailed below with respect to FIGS. 6-8. Although certain embodiments are explained in the context of an IPv6 addressing scheme, it is contemplated that other network routable address schemes can be utilized.

Each RFID tag 101 includes a microchip and a coiled antenna for storing and transmitting data about the asset 103. The RFID tags 101 can be active or passive, and need not be within line-of-sight with the RFID reader 105. Active tags include electronics that require power to transmit data to the RFID reader 105, and thus, are generally more costly than passive tags. Passive tags utilize the magnetic field generated between the tags and the RFID reader 105 as power to modulate and reflect RF signals emitted by the reader 105. Additionally, the RFID tags 101 can be read-only, volatile read/write, or write one/read many. The particular type of RFID tags 101 depend on the particular application and other factors, such as cost.

Operationally, the RFID reader 105 tunes to the same frequency as the tags 101. The system 100 can be configured to operate in a variety of frequencies from low to ultra-high frequency (UHF) or even microwave, depending on the separation between the RFID tags 101 and the RFID reader 105. For example, UHF frequencies can support applications distances of up to about 20 feet. The system 100 can operate in the frequency ranges of about 50 kHz to about 2.5 Ghz.

The output of the RFID reader 105 is then transmitted via a wired or wireless communication module 105*b* using, correspondingly, various wire line protocols or wireless protocols (over various frequency ranges) to a system controller 107. A processor 105*c* can also be included within the RFID reader 105 to execute other instructions or functions of the reader 105. The wireless system controller 107 can optionally be configured to provide the virtual network address interface 105*a*. The controller 107 interfaces with a local area network (LAN) 109. The LAN 109 provides connectivity to a public data network 113, such as the global Internet, via a router 111.

According to various exemplary embodiments, the RFID reader 105 includes a management agent that utilizes a management protocol, such as Simple Network Management Protocol (SNMP), to report state information, alerts, etc. about the RFID tags 101 to a tracking system 115 via a manager application (e.g., SNMP manager) 117. This arrangement permits efficient data collection for information about the assets 103 associated with the tags 101; the data can be maintained in an asset database 119.

By way of example, the system 100 uses IPv6 (IP Version 6) SNMP capabilities to track the RFID tags 101. Specifically, the RFID tag 101 are assigned unique IPv6 addresses, and the agent 105d can be a standards-based IPv6 SNMP agent running on the RFID reader 105. Once an RFID tag (e.g., tag 101a) has been sensed by the reader 105 and assigned a unique IPv6 address, the tag 101a becomes an SNMP capable device, with network visibility.

To exchange information, the manager 117 and the agent 105d use a Management Information Base (MIB), which is organized in a tree structure with individual variables. An object identifier (OID) is used to distinguish each variable uniquely in the MIB and in SNMP messages. Also, a set of commands are utilized between the manager 117 and the agent 105d. Such commands can include the following: GET, GET-NEXT, GET-RESPONSE, SET, and TRAP. The GET and GET-NEXT messages are used by the manager 117 to request information for a specific variable (which in the case, are appropriately defined for the assets 103); the agent 105d can respond in form of a GET-RESPONSE message with either the requested information or an error indication. The SET message enables the manager 117 to change the value of a specific variable. The agent 105d can issue the TRAP message to inform the manager of an event, alert, etc.

In the system 100, the IPv6 SNMP agent 105d can query the tag 101a and send SNMP Traps to a collector—e.g., manager 117. The traps that the reader 105 could send can include, for example, interface up or interface down; this would detect the insertion or deletion of an RFID tagged asset (i.e., the SNMP manager 117 would have knowledge of whether an RFID tag exists and where the tag is located). According to one embodiment, a specific RFID focused SNMP MIB can be created to track the location or environmental parameters. The extent of the "track-able" data can be determined as required and can follow a standardized MIB data inclusion process. The SNMP manager 117 can query the RFID tag 101a and access its user-defined data field to include this information in the MIB as well. With this approach, no specialized software is required to obtain detailed RFID tag information, network associated routing information, or any other information collected in the MIB. This enables real-time tracking of current data associated with the IPv6 enabled RFID tag 101a, as well as the entire history of the data and its related information stored in the MIB, thereby greatly simplifying and streamlining the data mining of all related information.

Figure 2:
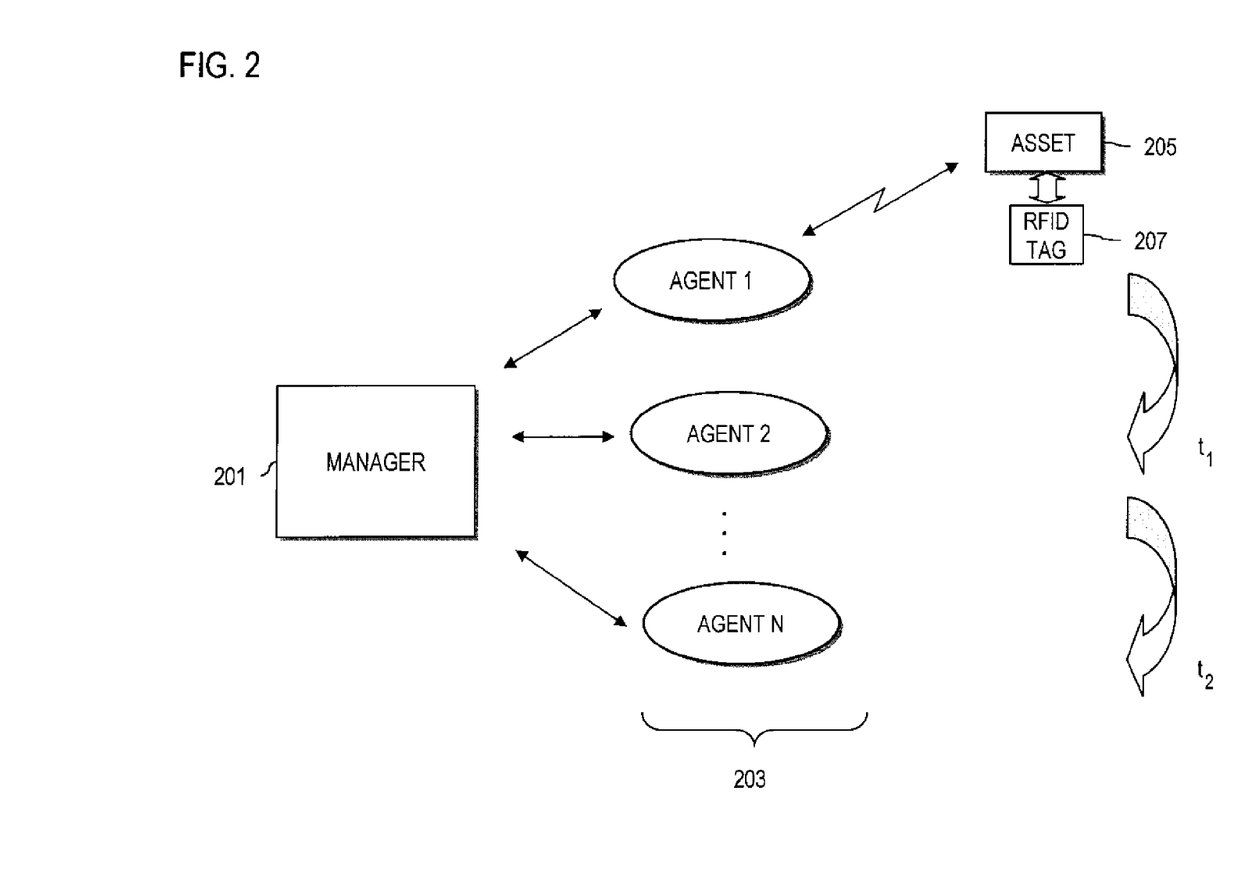
FIG. 2 is a diagram of a network management architecture for tracking RFID tags, according with an exemplary embodiment.

FIG. 2 is a diagram of a network management architecture for tracking RFID tags, according with an exemplary embodiment. Under this scenario, a manager 201 communicates with multiple agents 203. The agents 203 can reside in RFID readers that provide different scanning coverage areas, and report information about the location of an asset 205 using an RFID tag 207. For example, in the initial state, the RFID tag 207 is within the scanning radius of agent 1; accordingly, the agent 1 can send a TRAP message to indicate the presence or absence of the RFID tag 207. At time, $t_1$, the RFID tag 207 changes location to be within the scanning area of agent 2, which signals to the manager 201 the presence of the tag 207. Thereafter, at time, $t_2$, the RFID tag 207 moves to the scan area of agent N; this agent can likewise notify the manager 201 that asset 205 has entered a different zone. The messaging between the manager 201 and the agents 203 to convey the location of the RFID tag 207 is explained below with respect to FIG. 3.

Figure 3:
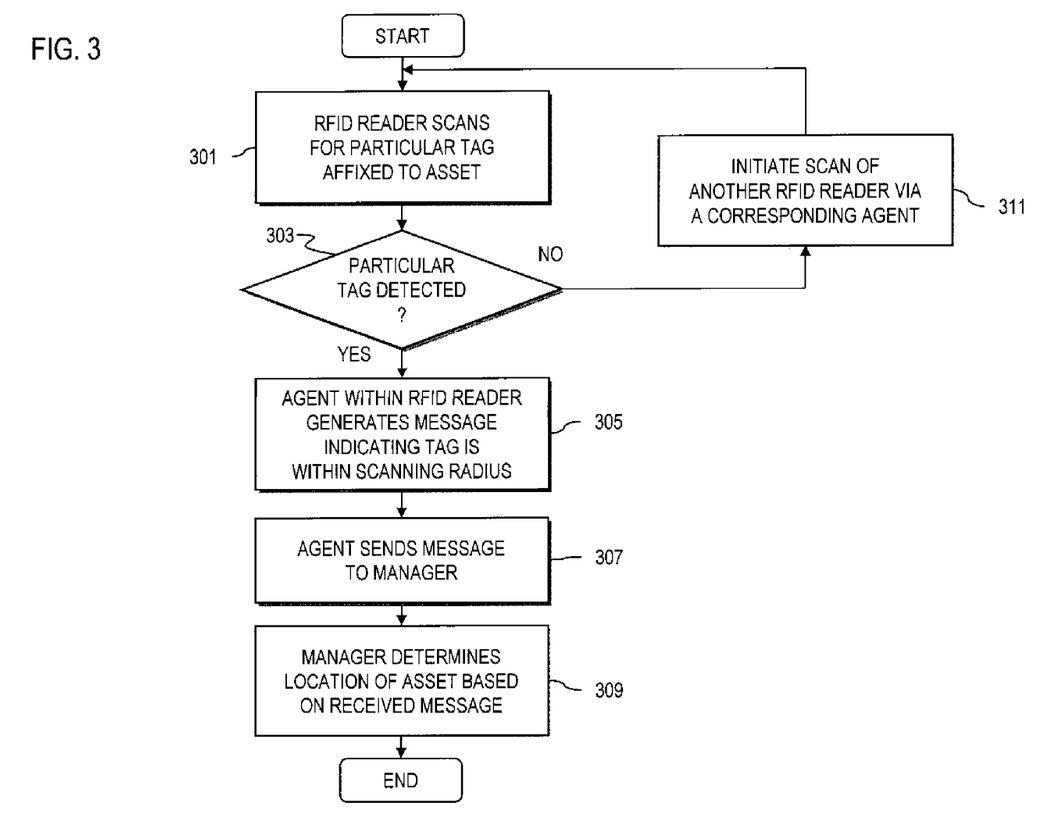
FIG. 3 is a flowchart of a process for locating RFID tags using a network management protocol, according to an exemplary embodiment.

FIG. 3 is a flowchart of a process for locating RFID tags using a network management protocol, according to an exemplary embodiment. In step 301, the RFID reader 105 scans for a particular RFID tag associated with an asset of interest. This scan can be initiated by the manager 117, and executed by the agent 105d. If the RFID tag of interest is present within the scan radius of the reader 105, as determined in step 303, the agent 105 generates a message (e.g., TRAP message) indicating that the RFID tag of interest has been detected, as in step 305. Next, the agent 105 sends the message to the manager 117 (step 307). In step 309, the manager 117 determines location of the asset (e.g., asset 103a) from the received TRAP message.

Back in step 303, if the tag is not found in the coverage area of the RFID reader 105, the manager 117 can initiate, as in step 311, a scan by another RFID reader via a different agent (not shown) for a different coverage area.

In addition to location determination, the agent 105d and the manager 117 can communicate to obtain other information about the asset 103.

Figure 4:
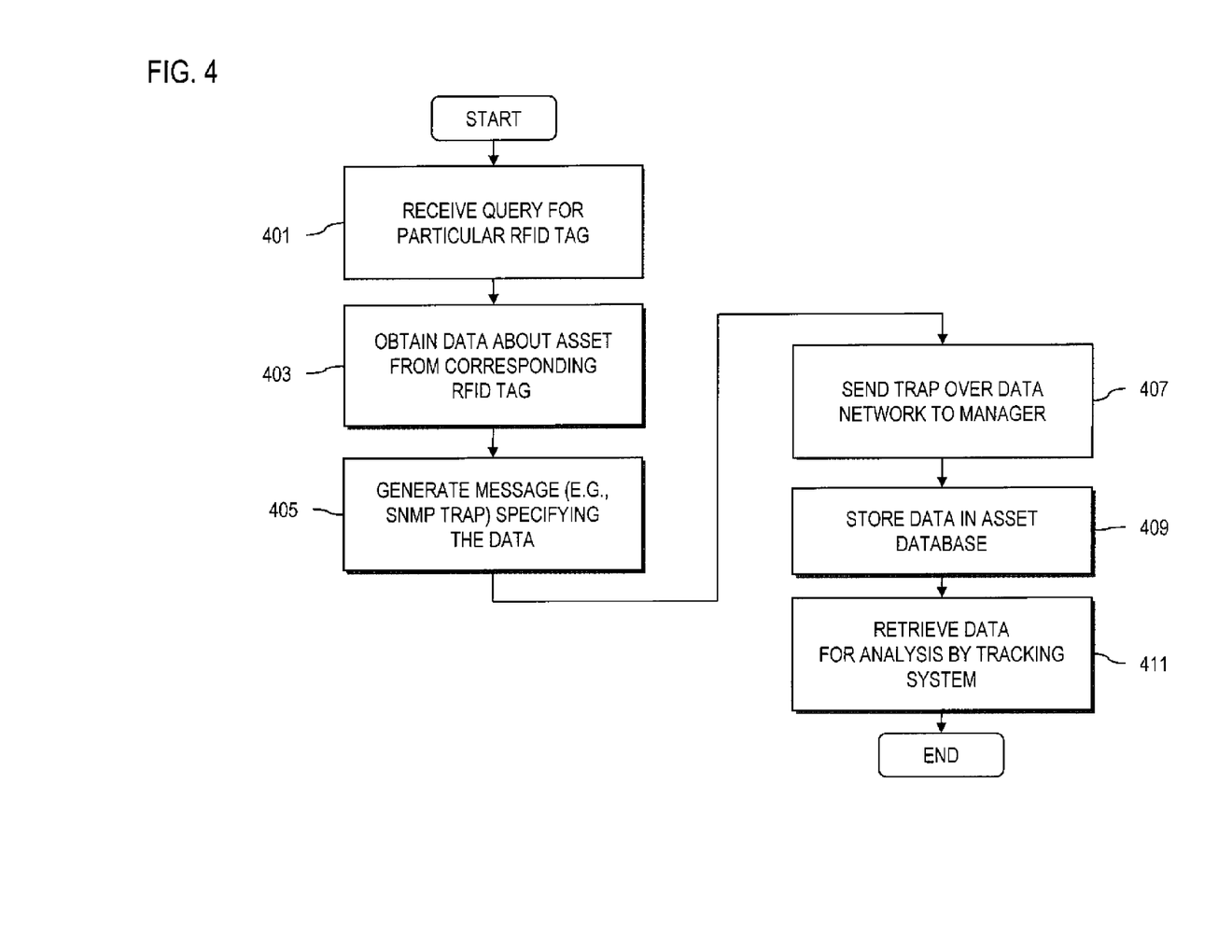
FIG. 4 is a flowchart of a process for collecting data from RFID tags over the data network of FIG. 1, according to an exemplary embodiment.

FIG. 4 is a flowchart of a process for collecting data from RFID tags over the data network of FIG. 1, according to an exemplary embodiment. By way of example, this process is explained with respect to acquiring data through the agent 105d for analysis by the tracking system 115. In step 401, the agent 105d receives a query from the manager 117 for a particular RFID tag (e.g., tag 101a), as identified by an IPv6 address, for instance. The RFID tag 101a can provide state information or other data about the asset 103a, per step 403. Upon receiving this data, the agent 105d prepares a management message, such as an SNMP TRAP message, that includes the data (step 405). The message is transmitted, as in step 407, over to the LAN 109 to the SNMP manager 117 within the tracking system 115. The received data is stored, per step 409, in the asset database 119. In step 411, the tracking system 115 can subsequently retrieve the data for analysis.

Figure 5:
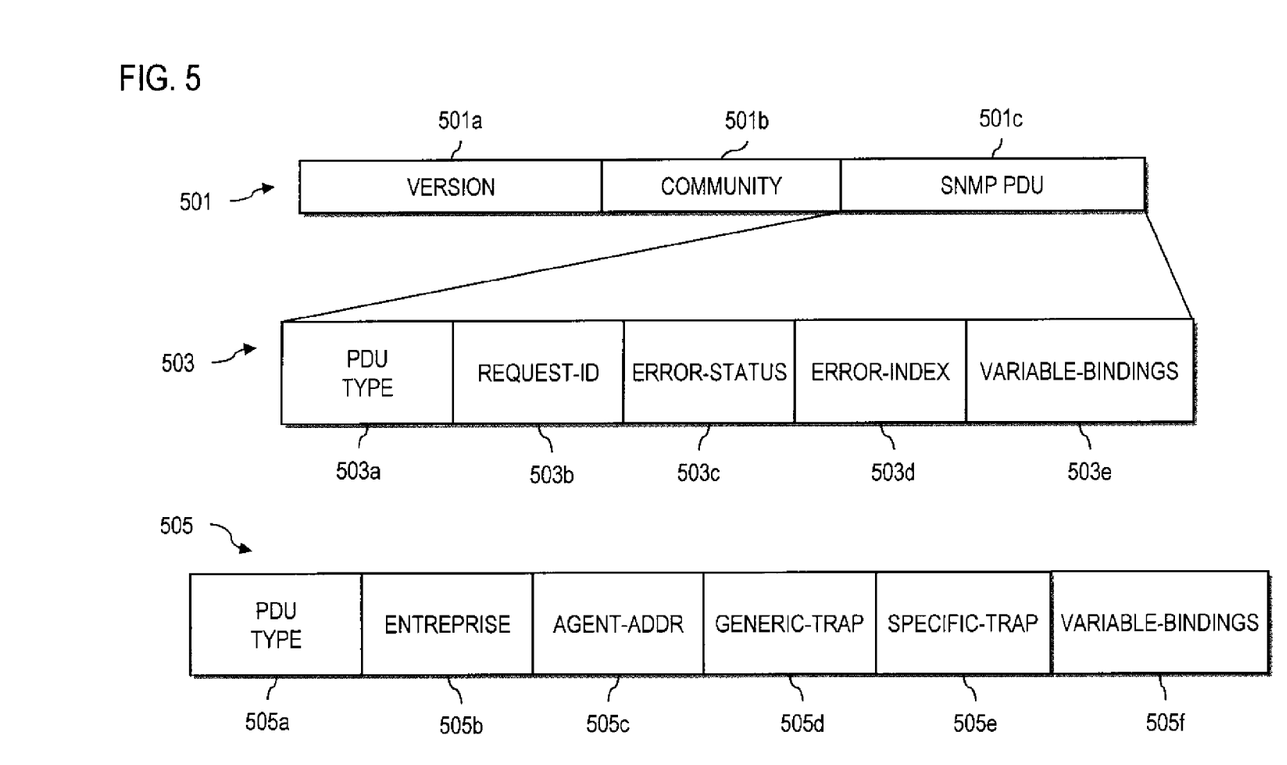
FIG. 5 is a diagram of an exemplary message format for communicating between the Simple Network Management Protocol (SNMP) manager and the agent within the system of FIG. 1, according with an exemplary embodiment.

FIG. 5 is a diagram of an exemplary message format for communicating between the Simple Network Management Protocol (SNMP) manager and the agent within the system of FIG. 1, according with an exemplary embodiment. An SNMP message 501 is an application layer protocol message, and thus, can be encapsulated in a User Datagram Protocol (UDP), which in turn is wrapped in the Internet Protocol (IP). The SNMP message 501 includes a Version field 501a, a Community String field 501b, and an SNMP PDU (Protocol Data Unit) 501c. The Version field 501a provides an integer value that identifies the version of SNMP (e.g., SNMPv1, SNMPv2, SNMPv3, etc.). The Community String field 501b can include a string used to add security to SNMP devices. The SNMP PDU 501c contains the body of the SNMP message.

The SNMP PDU 501c can be one of two formats 503, 505 depending on the command. Format 503 is utilized for the GET, GET-NEXT, GET-RESPONSE, and SET commands, and includes a PDU Type field 503a, a Request-ID field 503b, an Error-Status field 503c, an Error Index field 503d, and a Variable-Bindings field 503e. The Request-ID field 503b has an integer value that identifies a particular SNMP request; this index is supplied in the response from the SNMP agent 105d, so that the SNMP manager 117 can match this response to the proper request. The Error-Status field 503c permits the agent 105d to specify the type of error encountered in processing the request from the manager 117. The Error Index field 503d stores a pointer to the object that caused the error.

The TRAP message format 505 includes a PDU Type field 505a, an Enterprise field 505b, an Agent-Address field 505c, a Generic-Trap field 505d, a Specific-Trap field 505e, and a Variable-Bindings (Varbind) field 505f. The Enterprise field 505b provides a unique identifier of the SNMP agent that is sending the trap. A pre-defined trap value can be specified in the Generic-Trap field 505d, while a user-defined value for an enterprise-specific trap is provided in the Specific-Trap field 505e. The SNMP framework is more fully described in IETF RFC 1157, which is incorporated herein by reference in its entirety.

Figure 6:
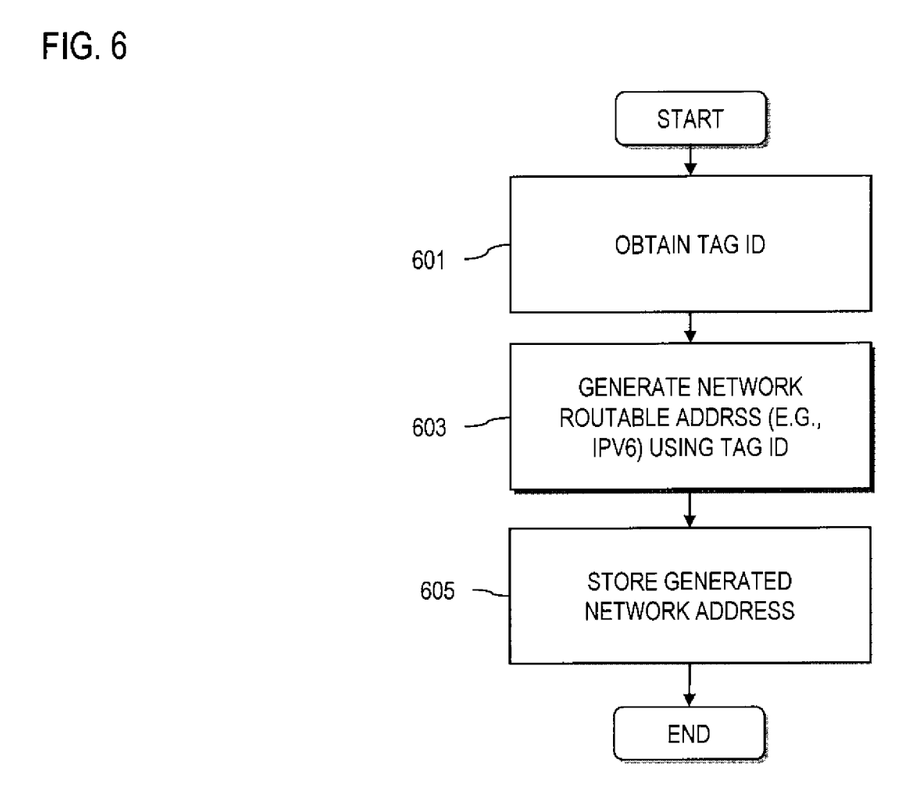
FIG. 6 is a flowchart of a process for mapping RFID tags to network addresses, according to an exemplary embodiment.

FIG. 6 is a flowchart of a process for mapping RFID tags to network addresses, according to an exemplary embodiment. In step 601, the RFID tag ID is determined. A network routable address, as in step 603, is next generated. The generated network address is then stored, per step 605. Thereafter, routing devices or nodes, e.g., router 111, can be populated with this address.

Figure 7:
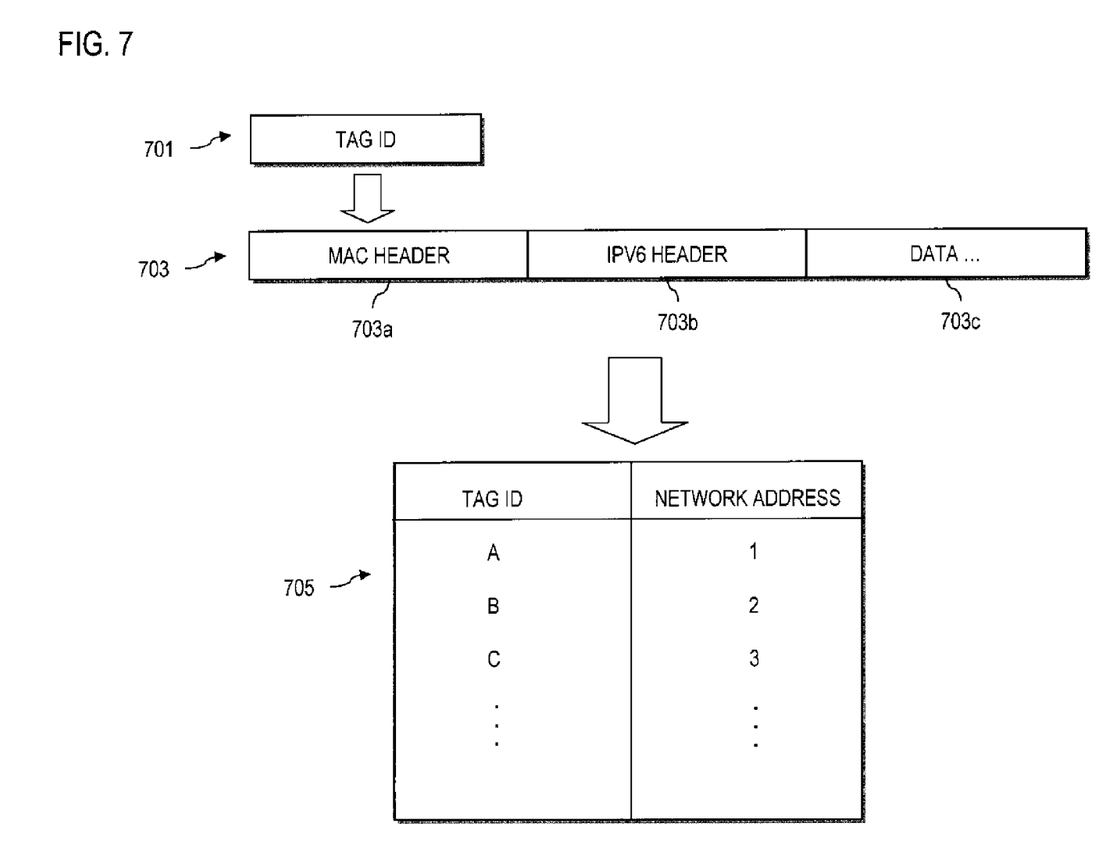
FIG. 7 is a diagram of an exemplary format of a network address derived from an RFID tag, according to an exemplary embodiment.

FIG. 7 is a diagram of an exemplary format of a network address derived from an RFID tag, according to an exemplary embodiment. In this example, a tag ID 701 is used to derive an IPv6 address. The network address 703 includes a Medium Access Control (MAC) header 703a, an IPv6 header 703b, and a data payload 703c. The tag ID 701, as a unique identifier, can serve as the MAC header.

The IPv6 header 703b includes various fields, as enumerated in Table 1:

TABLE 1

| FIELD | LENGTH | DESCRIPTION |
| --- | --- | --- |
| Version | 4 bits | IPv6 version number |
| Traffic Class | 8 bits | Internet traffic priority delivery value |
| Flow Label | 20 bits | Used for specifying special router handling from source to destination(s) for a sequence of packets. |
| Payload Length | 16 bits unsigned | Specifies the length of the data in the packet. When cleared to zero, the option is a hop-by-hop Jumbo payload. |
| Next Header | 8 bits | Specifies the next encapsulated protocol. The values are compatible with those specified for the IPv4 protocol field. |
| Hop Limit | 8 bits unsigned | For each router that forwards the packet, the hop limit is decremented by 1. When the hop limit field reaches zero, the packet is discarded. This replaces the Time-to-Live (TTL) field in the IPv4 header that was originally intended to be used as a time based hop limit. |
| Source address | 16 bytes | The IPv6 address of the sending node. |
| Destination address | 16 bytes | The IPv6 address of the destination node. |

IPv6 is further detailed in Internet Engineering Task Force (IETF) Request for Comment (RFC) 2460, which is incorporated herein by reference in its entirety.

As shown, the resultant address 703 can be stored as a table 705. The table 705 provides mapping of tag IDs A, B, C, etc. to the network addresses, 1, 2, 3, etc., respectively. This table 705 is used by the virtual address network 105a (of FIG. 1). The above addressing scheme is exemplary in nature, as other network addressing schemes can be utilized—e.g., Open System Interconnection (OSI) network layer addressing.

Figure 8:
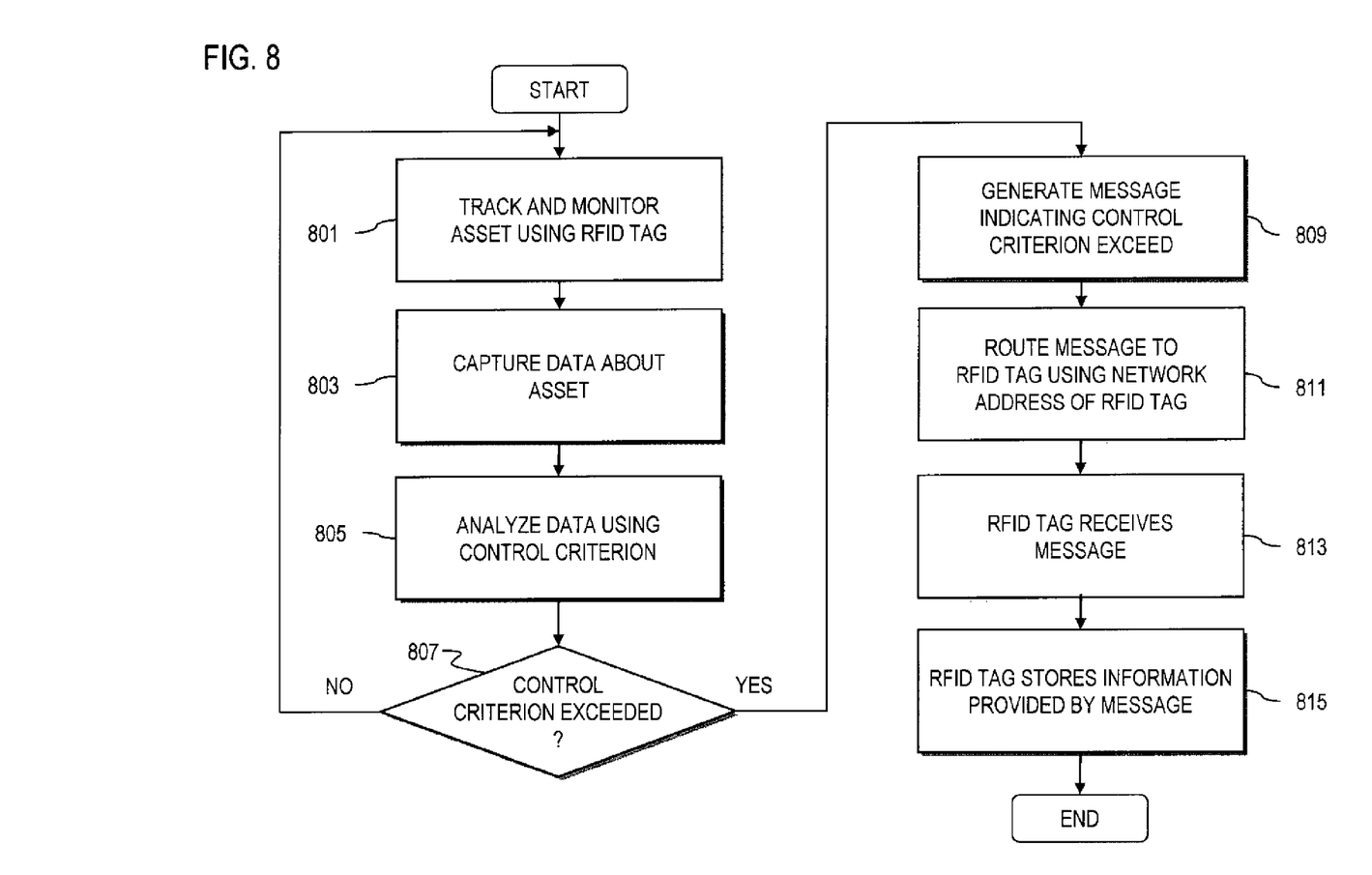
FIG. 8 is a flowchart of a process for communicating with RFID tags over the data network of FIG. 1, according to various exemplary embodiments.

FIG. 8 is a flowchart of a process for communicating with RFID tags over the data network of FIG. 1, according to various exemplary embodiments. By way of example, the process of tracking assets is explained with respect to the tracking system 115 of FIG. 1. The assets 103 are monitored and tracked, as in step 801, by the tracking system 115. In step 803, data about an asset (e.g., asset 103a) is captured, and the data is analyzed by the tracking system 115 using, in an exemplary embodiment, a control criteria (step 805). For example, the control criteria can specify environmental conditions that are to be monitored about the asset 103a; the asset 103a can be a perishable good that requires strict environmental controls. Under this scenario, the RFID tag 101a corresponding to the asset 103a can include a thermal sensor to register the temperature of the storage area. This information can be transmitted to the RFID reader 105 and provided to the tracking system 115.

The tracking system 115 can then apply the control criterion, for instance, that the temperature should not exceed a certain temperature otherwise the good can be compromised (e.g., spoiled, stale, melted, etc.). If the criterion is exceeded, as determined in step 807, the tracking system 115 generates a message indicating the critical temperature has been exceeded (step 809). The message can be captured in an IPv6 message that is routed, per step 811, to the RFID tag 101a, using a network address corresponding to the tag 101a over the Internet 113 to reach the local area network 109. At this point, the message is processed by the wireless system controller 107 and sent to the RFID reader 105. Upon receipt of the message (step 813), the RFID reader 105 determines the proper RFID tag by mapping the network address of the message to the tag ID using the virtual network address interface 105a.

Thereafter, the RFID reader 105 broadcasts the information contained within the message to RFID tag 101a. In step 815, the RFID tag 101a stores the information, which specifies that the asset 103a has been stored in an area that has experienced a temperature point exceeding a predetermined criterion. With this information captured on the tag 101a, the history of the asset 103a can be maintained and utilized appropriately to determine how the asset 103a is to be handled (e.g., discarded, etc.).

In addition to the above process for inventory control, the tracking system 105 can be deployed in a variety of other applications.

The above described processes relating to network addressing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
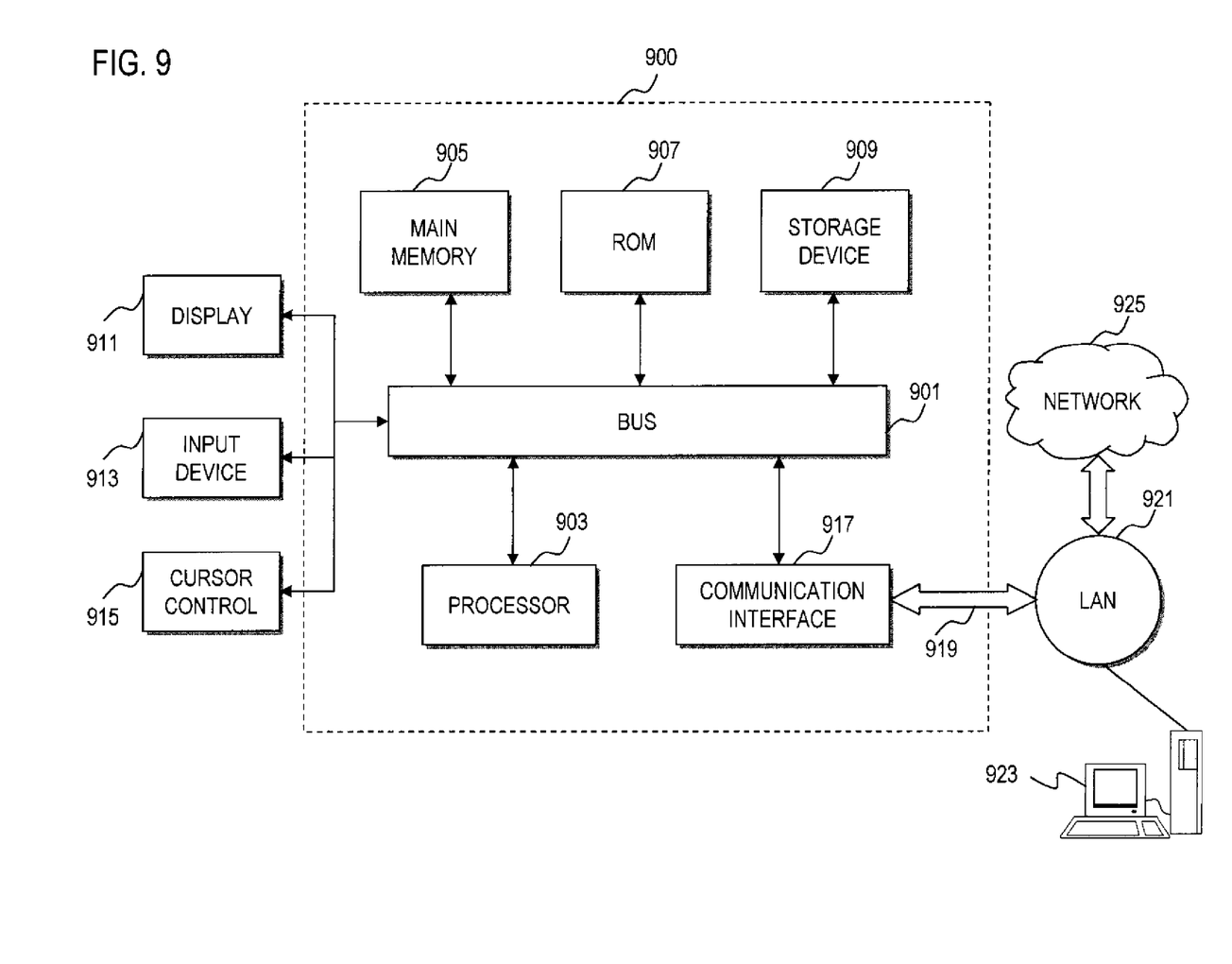
FIG. 9 is a diagram of a computer system that can be used to implement various exemplary embodiments.

FIG. 9 illustrates a computer system 900 upon which an exemplary embodiment can be implemented. For example, the processes described herein can be implemented using the computer system 900. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the exemplary embodiment. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent application is incorporated herein by reference in its entirety: co-pending U.S. patent application Ser. No. 11/564,508 filed Nov. 27, 2006, entitled "Method and Apparatus for Mapping Radio Frequency Identification (RFID) Tags to Network Addresses."

What is claimed is:

1. A method comprising:
  mapping, via a virtual address network, a network address of a radio frequency identification (RFID) tag attached to an asset for visibility of the RFID tag within a data network;

receiving a query, from a management manager, to retrieve data about the asset, the data residing within the RFID tag; and generating, by an agent in response to the query, a management message including the data for transmission over the data network to the manager configured to communicate with the agent using a management protocol, wherein the network address includes a medium access control (MAC) header including identification of the RFID tag and an internet protocol (IP) header including an IP address of the RFID tag, and the network address is stored in one field of a network address table of the virtual address network.

2. A method according to claim 1, further comprising:
scanning for the RFID tag to report to the manager whether the RFID tag is within a predetermined scanning radius for determination of location of an asset affixed to the RFID tag.

3. A method according to claim 1, wherein the IP header includes a version number, a traffic priority class, a flow label, a payload length, a next header, a hop limit, or a combination thereof.

4. A method according to claim 1, wherein the IP address includes an IPv6 address.

5. A method according to claim 1, further comprising:
transmitting by the agent an asynchronous notification indicating insertion or deletion of the RFID tag,
wherein the management protocol includes a Simple Network Management Protocol (SNMP).

6. A method according to claim 1, wherein the MAC header includes an Ethernet header.

7. A method according to claim 1, wherein the network address of the RFID tag is mapped to the RFID tag via the network address table.

8. An apparatus comprising:
an agent configured to map, via a virtual address network, a network address of a radio frequency identification (RFID) tag attached to an asset for visibility of the RFID tag within a data network, to receive a query, from a management manager, to retrieve data about the asset, the data residing within the RFID tag, and to generate a management message including the data for transmission in response to the query over the data network to the manager configured to communicate with the agent using a management protocol,
wherein the network address includes a medium access control (MAC) header including identification of the RFID tag and an internet protocol (IP) header including an IP address of the RFID tag, and the network address is stored in one field of a network address table of the virtual address network.

9. An apparatus according to claim 8, further comprising:
circuitry configured to scan for the RFID tag to report to the manager whether the RFID tag is within a predetermined scanning radius for determination of location of an asset affixed to the RFID tag.

10. An apparatus according to claim 8, wherein the IP header includes a version number, a traffic priority class, a flow label, a payload length, a next header, a hop limit, or a combination thereof.

11. An apparatus according to claim 8, wherein the IP address includes an IPv6 address.

12. An apparatus according to claim 8, further comprising:
circuitry configured to transmit an asynchronous notification indicating insertion or deletion of the RFID tag,
wherein the management protocol includes a Simple Network Management Protocol (SNMP).

13. A method comprising:
mapping, via a virtual address network, a network address of a radio frequency identification (RFID) tag attached to an asset for visibility of the RFID tag within a data network;
generating and transmitting a query to retrieve data about the asset, the data residing within the RFID tag;
receiving, over the data network, a management message from an agent according to a management protocol in response to the query, wherein the RFID tag is assigned a network address for visibility within the data network, and the data resides within the RFID tag,
wherein the network address includes a medium access control (MAC) header including identification of the RFID tag and an internet protocol (IP) header including an IP address of the RFID tag, and
the network address is stored in one field of a network address table of the virtual address network.

14. A method according to claim 13, further comprising:
instructing the agent to initiate scanning of the RFID tag to report to whether the RFID tag is within a predetermined scanning radius for determination of location of an asset affixed to the RFID tag.

15. A method according to claim 13, wherein the agent resides within an RFID reader.

16. A method according to claim 15, wherein the IP header includes a version number, a traffic priority class, a flow label, a payload length, a next header, a hop limit, or a combination thereof.

17. A method according to claim 15, wherein the IP address includes an IPv6 address.

18. A method according to claim 13, further comprising:
receiving from the agent an asynchronous notification indicating insertion or deletion of the RFID tag,
wherein the management protocol includes a Simple Network Management Protocol (SNMP).

19. An apparatus comprising:
a manager configured to map, via a virtual address network, a network address of a radio frequency identification (RFID) tag attached to an asset for visibility of the RFID tag within a data network; to generate and transmit a query to retrieve data about the asset, the data residing within the RFID tag; to receive, over the data network, a management message from an agent according to a management protocol in response to the query, wherein the RFID tag is assigned a network address for visibility within the data network, and wherein the data resides within the RFID tag,
wherein the network address includes a medium access control (MAC) header including identification of the RFID tag and an internet protocol (IP) header including an IP address of the RFID tag, and
the network address is stored in one field of a network address table of the virtual address network.

20. An apparatus according to claim 19, wherein the manager is further configured to instruct the agent to initiate scanning of the RFID tag to report to whether the RFID tag is within a predetermined scanning radius for determination of location of an asset affixed to the RFID tag.

21. An apparatus according to claim 19, wherein the agent resides within an RFID reader.

22. An apparatus according to claim 21, wherein the IP header includes a version number, a traffic priority class, a flow label, a payload length, a next header, a hop limit, or a combination thereof.

23. An apparatus according to claim 21, wherein the IP address includes an IPv6 address.

24. An apparatus according to claim 19, further comprising:
   circuitry configured to receive form the agent an asynchronous notification indicating insertion or deletion of the RFID tag,
   wherein the management protocol includes a Simple Network Management Protocol (SNMP).

* * * * *